United States Patent Office 3,546,142
Patented Dec. 8, 1970

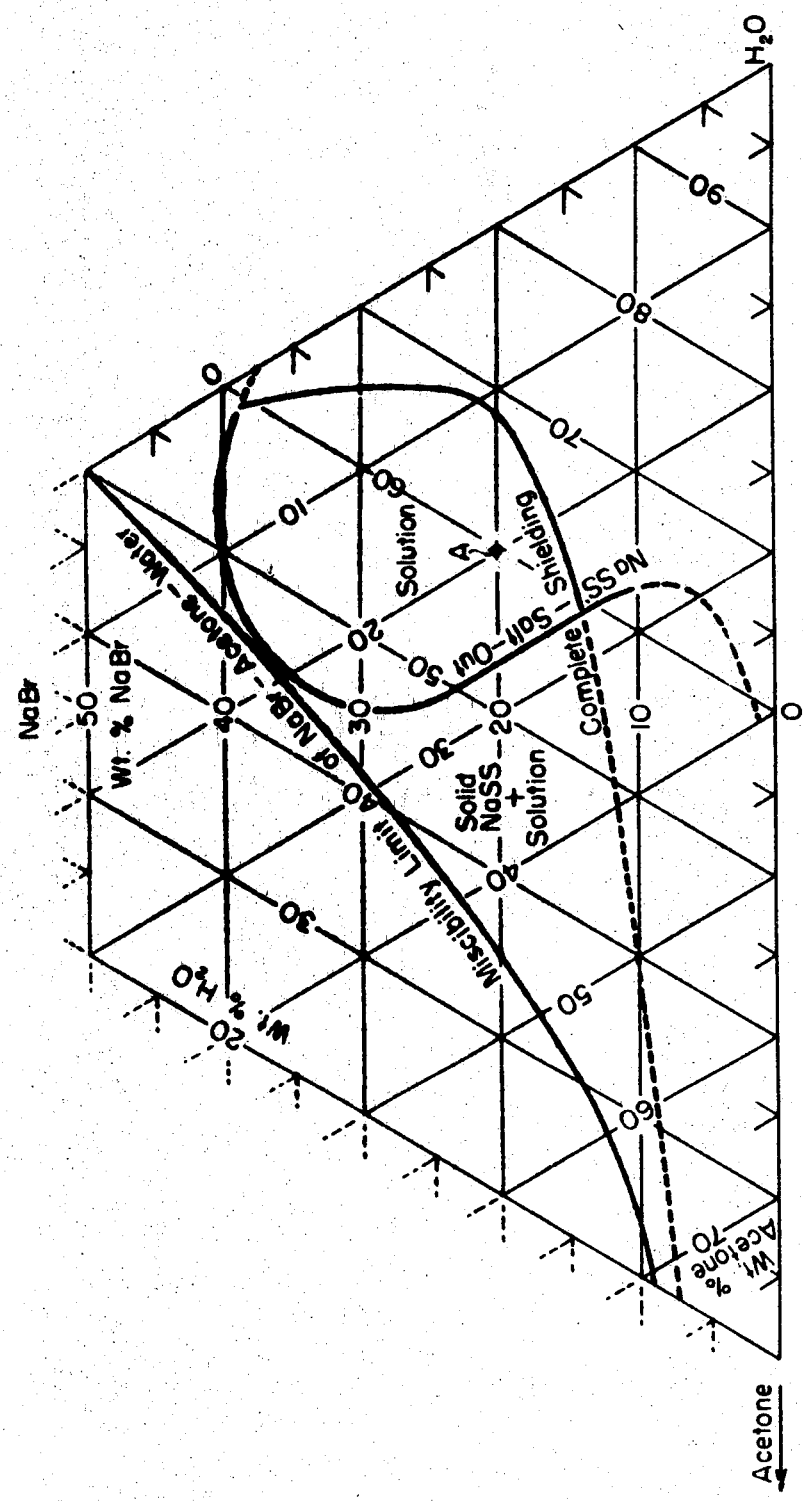

3,546,142
POLYELECTROLYTE STRUCTURES
Alan S. Michaels, Lexington, and Richard G. Miekka, East Natick, Mass., assignors to Amicon Corporation, Cambridge, Mass., a corporation of Massachusetts
Continuation-in-part of application Ser. No. 341,834, Jan. 24, 1964, which is a continuation-in-part of application Ser. No. 147,320, Oct. 24, 1961. This application Jan. 19, 1967, Ser. No. 610,266
Int. Cl. C08f 27/06
U.S. Cl. 260—2.1
21 Claims

ABSTRACT OF THE DISCLOSURE

Dissolving a polycation polymer and a polyanion polymer in a mixture of water and electrolyte and optionally a water-miscible organic solvent, forming the solution into the desired shape, and reducing the activity of the electrolyte until a gel forms. The activity of the solution is reduced by dilution or cooling or removing electrolyte or evaporating solvent. The electrolyte may be volatile and removed by evaporation, or it may be acidic or basic, and its activity may be reduced by neutralization. The shaped articles are useful as ion sorbing resins, selectively permeable and semi-permeable membranes, protective coatings, artificial biological tissues, microporous sponges and filters, semi-conductor elements, and humidity sensitive conductive elements.

---

This application is a continuation-in-part of application Ser. No. 341,834 filed Jan. 24, 1964, now abandoned, which in turn is a continuation-in-part of application Ser. No. 147,320 filed Oct. 24, 1961 also now abandoned.

This invention relates to novel solid polymeric materials formed by coprecipication of water soluble polyelectrolytes having dissociable ionic groups of opposite charge, and to methods of forming such solids. The materials provided by this invention are useful as ion sorbing resins, selectively permeable and semi-permeable membranes and barriers, protective coatings, artificial biological tissues, microporous sponges and filters, semiconductor elements, and humidity sensitive conductive elements, to name but a few. They may be formed to any desired shape by casting, molding, fiber drawing, or by fabricating methods, such as machining and grinding. Thus, fibers, films, sheets, tubes, rods, and blocks of these materials may be provided and more intricate articles may be formed by casting, molding or fabricating techniques.

In general, the materials of this invention are solid materials of controllable shape and dimension (as distinguished from random particles or fractured solids) formed by causing an anionic and a cationic water soluble polyelectrolyte to coprecipitate from an ion shielded solution under controlled conditions by which the shielding effect of the solution is reduced.

The polyelectrolytes useful in this invention are organic polymers having dissociable ionic groups which impart electrolytic characteristics in forming salts and acids (in the case of anionic polyelectrolytes) and bases (in the case af cationic polyelectrolytes). Typical of these are the polymers of sodium styrene sulfonate and of vinyl benzyl trimethyl ammonium chloride, and other materials of the same general type having a synthetic organic polymeric structure, which, without the ionic groups (sulfonate or quaternary amminoum), would be a water insoluble film forming material. They are accordingly chracterized by a sufficiently high molecular weight to be solid and capable of film formation (typically greater than 50,000) while having sufficient dissociable ionic groups chemically bonded to the polmeric structure to be water soluble. As a very general rule there should be at least one ionic group for every six repeating monomer (mer) units, or for each average chain interval of 12 carbon atoms.

Thus, in addition to the preferred polymers of sodium styrene sulfonate and vinyl benzyl trimethyl ammonium chloride, copolymers of these materials with other vinyl compounds in molar ratios of 1:6 or less may be employed, as well as other well known polyelectrolytes of the same general type, such as polyacrylic acid, hydrolyzed copolymers of styrene and maleic anhydride, polyvinyl sulfonic acid, sulfonated polystyrene, sulfonated polyvinyl toluene, alkali metal salts of the foregoing acidic polymers, polyethyleneimine, polyvinyl pyridine, and polydimethylaminoethyl methacrylate, quaternized polyethylene imine, quaternizedpoly (dimethylaminoethyl) methacrylate, polyvinyl methyl pyridinium chloride, and the like. Of the polymers containing anionic groups, those containing sulfonate groups are preferred, while cationic polymers containing quaternary ammonium groups are preferred, the sulfonate and quaternary ammonium groups preferably being the sole ionic groups present in the polymers.

When solutions of oppositely charged polyelectrolytes are mixed together under proper conditions of concentration and temperature, the oppositely charged macroions coreact ionically and precipitate from solution. Because of their high charge density, polyelectrolytes have a much greater tendency to associate with each other than do their corresponding monomers. Most polyelectrolyte precipitates can be dissolved, or their formation prevented, by the addition of sufficient amounts of "indifferent" soluble ionic salts such as magnesium sulfate or sodium chloride. Subsequent removal or dilution of these shielding salts results in reprecipitation of the polyelectrolyte complexes.

This invention provides novel processes for the formation of polyelectrolyte coprecipitates into any desired shape or size, and in many instances containing widely varying relative amounts of the oppositely charged polyelectrolyte species. These formation methods are described below and apply generally to any and all solutions or mixtures containing at least one polyelectrolyte with a net anionic charge, and one polyelectrolyte with a net cationic charge which are capable of reacting ionically under proper conditions to produce solid precipitates.

In practicing the method of this invention, an intimate, solvated mixture of the oppositely charged polyelectrolytes to be used (together with any desired additional fillers, plasticizing agents, etc.) is formed in a suitable solvent (usually aqueous) or solvent mixture by the addition of sufficient ionic salts, acids, and/or bases (ion shielding electrolyte) to prevent ionic interaction between the polyelectrolytes. The mixture may be heated, and/or a suitable amount of a low polarity miscible liquid may be added as explained below to reduce the amount of ionic material required to prevent interpolymer reaction. In general, the concentration of each polyelectrolyte must be at least 0.5 percent by weight, preferably above 1.0 percent by weight of the mixture in order to obtain continuous solids in the subsequent processing.

The salts, acids and/or bases must be present in the solution in an amount of at least 10% by weight of the total solution, preferably at least 20% by weight. Although amounts as great as 50% or more by weight of the total solution may be used, it is unnecessary and frequently undesirable to employ any more than the minimum required to prevent precipitation of the polyelectrolytes. Among the salts, acids and bases which may be employed as ion shielding electrolytes are those which are soluble in water to the extent of at least 10% by weight at room temperature, which are highly ionized electrolytes in aqueous solution (having a pK less than 2.0), and which contain no ions which interact with the polyelectrolytes to precipitate them. Such salts include the alkali metal and the alkaline earth metal salts as well as beryllium, ferrous, nickelous, cobaltous, lanthanum, manganous, stannous, and tetramethylammonium salts as well as alkyl pyridinium salts in which the alkyl group has from 1 to 3 carbon atoms. These salts include the chlorides, bromides, nitrates and sulfates of all of the foregoing cations. In addition, alkali metal chromates may be used as well as both alkali metal and alkaline earth metal perchlorates, perbromates and periodates. Acids which are useful include hydrochloric, hydrobromic, nitric, sulfuric, chromic, perchloric, perbromic, periodic, mono-, di-, and tri-chloroacetic, trifluoroacetic, alkyl sulfonic (containing up to 20 carbon atoms in the alkyl group), and alkylbenzene sulfonic (containing up to 20 carbon atoms in the alkyl group). Bases which may be used include alkali metal hydroxides, barium hydroxide, tetramethyl ammonium hydroxide, and alkylpyridinium hydroxides such as the methyl-, ethyl-, and propyl-pyridinium hydroxides.

The presence of any of the foregoing salts, acids or bases (shielding electrolytes) having a pK less than 2.0 in an amount of at least 10% by weight in water will prevent the precipitation of, i.e. will maintain in solution, most of the oppositely charged polyelectrolytes described above. However, when the polyelectrolytes contain strongly ionizing groups, such as the preferred sulfonate and quaternary ammonium groups, certain of such salts, acids or bases (shielding electrolytes) are preferred for their effectiveness and are preferably employed at elevated temperatures or in the presence of a water-miscible low polarity liquid or both.

The low polarity liquid is preferably an organic solvent having a volatility approximately as great as that of water or even greater. Suitable solvents include acetone, dioxane, methanol, ethanol, isopropanol, tert.-butyl alcohol, pyridine, morpholine, tetrahydrofuran, N-methyl pyrrolidone, and 2-methoxy ethanol. The solvent, when present, may be used in amounts up to 40% by weight of the total solution, and preferably is present in an amount from 10% to 30% by weight.

The salts, acids or bases (shielding electrolytes) which are used when the polyelectrolytes contain such groups as sulfonate and quaternary ammonium are those which dissolve to the extent of at least 15% by weight at room temperature in a mixture of water with the water-miscible volatile organic solvent when the mixture contains 50% by weight of the organic solvent. The salts, acids and bases which satisfy this requirement include, among others, strong acids such as hydrochloric, hydrobromic, sulfuric, nitric, and trichloroacetic; lithium, magnesium, and calcium chlorides; alkali metal and alkaline earth metal bromides; the nitrates and perchlorates of lithium and of alkaline earth metals; magnesium sulfate; and the alkali metal and alkaline earth metal salts of alkyl sulfonic acids, or aryl sulfonic acids and of alkaryl sulfonic acids in which the alkyl groups contain up to 20 carbon atoms. Preferably solutions of those polyelectrolytes which contain such groups as sulfonate and quaternary ammonium contain in addition to water a volatile water-miscible organic solvent in an amount at least 2% by weight, or even better 10 to 30% by weight, based on the total weight of solution, and also contain at least 10% by weight (based on the total weight of solution) of a shielding electrolyte having the solubility characteristics set forth above.

The solution thus prepared is then caused to gel by changing conditions so as to permit at least marginal interaction to occur between the polyelectrolytes. The following methods for causing initial gelation may be used:

(a) By cooling a mixture which contains only enough salt, acid, and/or base to prevent interpolymer reaction at elevated temperatures. The method is ideally suited for applying uniform coatings to objects of almost any shape by the simple expedient of dipping the cooled object into a hot, marginally shielded polyelectrolyte mixture until a layer of gelled mixture of the desired thickness has built up on the surface of the object.

(b) By evaporation of a volatile liquid component from a mixture to which a volatile, low polarity liquid (e.g. acetone) has been added to reduce the amount of salt required to shield the polyions. We have found that this technique of gelation is particularly useful for the formation of fibers or filaments of polyelectrolyte coprecipitates: If a rod or other solid object is dipped into such a mixture and slowly removed, a monofilament of the mixture is drawn out which gels rapidly by solvent-evaporation. Filaments of indefinite length, and very uniform diameter can be prepared in this fashion. Alternatively, the solution can be extruded through a die in the form of filaments into warm air, where gelation rapidly takes place. These filaments can then be washed, stretched, dried, or otherwise treated to convert them into strong, resilient fibers.

(c) By reducing the concentration of the shielding ionic species. This may be accomplished by evaporating a volatile electrolyte, by diluting the mixtures, or contacting their surfaces with water or other suitable solvent to extract the microions. Rapid surface gelation prevents the loss of polymer into the extracting solution but permits water soluble impurities such as salts, etc., to be removed.

(d) By neutralization of shielding acids or bases. Polyelectrolytes whose ionic functions are carboxyl or amine groups are usually more easily shielded by strong acids or bases than by ordinary salts. Raising the pH (acid-shielded systems), or lowering the pH (base-shielded systems) will result in gelation provided the amount of salt produced in the neutralization reaction is insufficient to prevent interpolymer reaction.

All of the foregoing changes in conditions involve a reduction in the activity of the electrolyte, and the term "reducing the activity" of the electrolyte is a generic term which embraces all of these operations.

It should be noted that the gelation step is not necessarily a distinct and separate process, but may be an integral part of the hardening process(es) described below.

Hardening of the mixtures gelled by any of the processes described above may be accomplished by contacting them with water or other suitable solvent, if necessary, to extract all, or any desired portion of the residual shielding salt. With some polyelectrolyte systems (e.g., poly(vinylbenzyltrimethyl ammonium)-poly(styrene sulfonate)), the contractive forces developed upon extraction of the shielding salt are so great that internal porosity develops. This is prevented (if desired) by partially drying the solids after each of a series of brief washings, keeping the internal solvent composition near that at which initial gelatin occurs, until the polymer concentration becomes high enough so that internal porosity will not develop. The solids may be dried as a final step in the hardening process.

After hardening, the precipitates may be converted into any desired form by stamping, machining, sanding, carving, etc. Before hardening, the liquid or gelled mixtures may be molded or extruded to help achieve the desired final shapes. Fibrous, particulate precipitates can be formed by adding the original liquid mixtures to water or other suitable solvent under high shear such as in a Waring Blendor.

A preferred method of carrying out this invention is described in detail below with reference to the formation of a coprecipitate of poly (sodium styrene sulfonate) and poly (vinyl benzyl trimethyl ammonium chloride) from a solvent mixture of water, acetone, and sodium bromide. Reference is made to the accompanying drawing which is a ternary diagram showing the solubility of the polyelectrolytes in the water-acetone-sodium bromide system.

EXAMPLE 1

In this procedure poly (sodium styrene sulfonate), (NaSS) an anionic polyelectrolyte having an average molecular weight of about 760,000, and poly (vinyl benzyl trimethyl ammonium chloride), (VBTAC) a cationic polyelectrolyte having an average molecular weight of about 300,000, were reacted together to yield transparent solid resins of controlled shape and size. The polyelectrolytes were first purified by treating aqueous solutions containing 3–5 percent by weight of the polymers with a mixture of a conventional cation exchange resin in the hydrogen form and an anionic exchange resin in the hydroxide form for about 12 hours, and the solutions were then filtered. The anionic polyelectrolyte solution was then passed over a cation exchange resin in the sodium form while the other was passed over an anionic resin in the chloride form to assure that the desired counter-ions were present; the solutions were then dried.

Solutions containing 5–10 percent by weight of each polyelectrolyte dissolved in a solvent consisting of 60 percent water, 20 percent NaBr, and 20 percent acetone were made up with polymer equivalence ratios of 2 VBTAC/1 NaSS, 1 VBTAC/1 NaSS, and 1 VBTAC/2 NaSS. The solutions were poured into paraffin coated glass petri dishes and allowed to gel by evaporation of the acetone. The samples were next placed in an oven at 50° C. to evaporate water until, or shortly before, a slight opacity developed at the periphery of the gels due to salt out of NaSS, and were then washed briefly with water to extract some of the NaBr, and replaced in the oven to again allow water evaporation to the point of insipient NaSS precipitation. This alternate washing and drying procedure was continued until the polymer content was 40–50 percent of the total weight of the samples, after which the polysalts were washed with demineralized water until no more salt could be extracted from them, cut into samples of the desired size, and dried at 50 percent humidity over a sulfuric acid-water mixture to yield amber, transparent solids. The purpose of this rather elaborate wash-dry procedure was to remove as much salt, water, and acetone as possible from the polysalts while keeping the overall solvent composition near the region of polysalt solubility. If too much salt was extracted from the dilute gels by prolonged contact with water, internal porosity developed due to contraction of the polymer volume, and the final polysalts were microporous sponges rather than continuous solids. Where a porous structure is desired, drying is carried out without the intermediate washing steps.

After final washing of the polysalts, the interpolymer reactions were found to be surprisingly complete. No sodium could be detected by flame tests made on samples cut from the quaternary-rich polysalts, and no visible silver halide precipitate was formed when silver nitrate solution was added to a tenth molar sodium nitrate solution which had been equilibrated with a sample of NaSS-rich polysalt. The neutral polysalts gave negative tests for both sodium and bromide ions, with the exception that small opaque regions (if present) at the periphery of the samples gave weak positive flame tests for sodium.

The mechanism of gel formation demonstrated in the preceding example is readily understood by referring to the ternary diagram given in the drawing. The presence of sodium bromide in sufficient concentration has a shielding effect which prevents the two polyelectrolytes from reacting, while the presence of acetone reduces the amount of sodium bromide required, as shown by curve designated "complete shielding." Above and to the left of this curve the polyelectrolytes remain in solution, while at compositions below and to the right of this curve, precipitation occurs. It will also be noted that at relatively high acetone concentrations and/or sodium bromide concentrations a second limiting effect arises from the anionic polyelectrolyte being salted out separately from the cationic polyelectrolyte.

In the foregoing example an initial solution having a composition at the point designated "A" is brought by the elimination of acetone to a composition lying generally to the right at or near the "complete shielding" line. At this point gel formation occurs, and further processing is carried out to maintain the gel near the limiting composition for complete shielding, by removal of both water and sodium bromide until a substantially dry non-porous solid is produced.

In the ternary solvent system, sodium bromide is employed as a salt which is sufficiently soluble to provide a concentration sufficient for ionic shielding, and which is chemically inert as not to react with the polyelectrolytes. Other salts having these characteristics may be employed with equally good results. The presence of acetone improves the solubility of the polyelectrolytes, or, in other words, enhances the shielding effect of the sodium bromide thus rendering lower concentrations more effective. Other water-miscible volatile organic solvents particularly those which are solvent for the organic polymer structure itself (without the ionic groups) may be used instead with similar results, or alternatively the organic solvent fraction may be omitted altogether, particularly where the polyelectrolytes do not contain strong ionic groups such as sulfonate or quaternary ammonium groups, or where the solution is cooled from an elevated temperature to effect coprecipitation.

EXAMPLE 2

Approximately 100 parts by weight of pure dry, powdered poly (sodium styrene sulfonate) and 333 parts by weight of a 30 percent aqueous solution of poly (vinyl benzyl trimethyl ammonium chloride) were added with stirring to a solution containing 266 parts by weight of calcium nitrate tetrahydrate, 266 parts of dioxane, and 33 parts of water.

The solution so prepared was treated in the same fashion as the solution described in Example 1 above, being gelled by evaporation of the dioxane, then repeatedly dried and washed with substantially the same results.

Equally good results may be obtained by substituting other salts, acids or bases, and other organic solvents, as set forth hereinabove, for those in Examples 1 and 2.

In addition to massive gel structures, membranes and filaments of polyelectrolyte coprecipitates may be prepared with or without an oriented molecular structure. By stretching the membrane or filament, an oriented structure showing a high degree of birefringence under polarized light may be attained. Oriented polysalt films have been obtained by drawing the initially precipitated gel 2–5 times unidirectionally, and then washing them with water and drying them. A highly fibrous structure results which is similar to that of abestos. Filaments have been prepared by drawing a strand from a solution of the polyelectrolytes in water acetone and NaBr slowly so as to permit gelation by acetone evaporation. After washing briefly with water, drying, and re-wetting, the filaments could be oriented by stretching 1.5–2 times their length. A 2- to 3-fold increase in the strength over the unstretched filaments results.

The ability of ion shielded polyelectrolyte solutions to gel has been found not to be dependent on the relative amounts of the two polymers in solution, at least up to a ratio of 30:1 of one polyelectrolyte over the other. The important variable is the concentration of the more dilute polymer, of which at least about 0.5 percent by weight is required for vinyl benzyltrimethylammonium chloride and at least about 0.2 percent by weight of sodium styrene sulfonate polymer. Gels may be formed in relative ratios of 10:1 and 1:10, but compositionally stable mixtures in water are not obtained outside the ratios 5:1 and 1:5.

In electrical circuits the polyelectrolyte gels of this invention exhibit semi-conductivity. When placed in a circuit between two conductors with means of reversing the polarity, the resistance in one direction was many times that of the resistance in the other direction. The conductivity film is also humidity sensitive. A film coated on a thumb-tack and contacted on the opposite side by a nichrome wire exhibited a resistance of 100 megohms in dry room air, but when exposed to higher humidity the resistance dropped 1000-fold in 10–15 seconds. In view of this rapid response, a highly sensitive humidity sensing system is provided by this invention.

Shaped articles consisting essentially of a continuous gel structure having a lattice in which the sole reactants are polyelectrolytes containing sulfonate groups and those containing quaternary ammonium groups are remarkably different in properties from similar gels in which one or more of the polyelectrolytes contains weak ionic groups such as carboxylate, the former being much more moisture resistant, inter alia.

From the foregoing disclosure it will be seen that a novel type of polymeric material having a great variety of uses and applications is available. Although the invention has been described with specific reference to its presently preferred embodiment, it is contemplated that modifications will readily occur to those skilled in the art and familiar with this disclosure and that such can be made without departing from the scope of this invention. In particular it is contemplated that those skilled in the art will readily select other polyelectrolytes and solvent systems for them by which the general technique of precipitation from an ion shielded solution described herein may be employed.

Having thus disclosed our invention, we claim and desire to secure by Letters Patent:

1. The method of making shaped articles of polyanionpolycation resin which comprises forming an aqueous solution containing reactive quantities of a polyanion polymer and a polycation polymer capable of coreacting to form a water-insoluble precipitate, each of said polymers being water soluble in the absence of the other, said solution containing sufficient ion shielding electrolyte at least 10% by weight of the total solution, to maintain said polymers in solution, forming the solution into the desired shape, then reducing the activity of said electrolyte until a solid gel forms.

2. The method of claim 1 wherein the activity of the electrolyte is reduced by diluting the solution to lower the electrolyte concentration.

3. The method of claim 1 wherein the activity of the electrolyte is reduced by cooling the solution.

4. The method of claim 1 wherein the activity of the electrolyte is reduced by removing electrolyte from the solution.

5. The method of claim 1 wherein the solution contains in addition a water-miscible organic solvent and wherein the activity of the electrolyte is reduced by evaporating said solvent from the solution.

6. The method of claim 1 wherein the solution contains in addition a water-miscible organic solvent and wherein the activity of the electrolyte is reduced by diluting the solution with water to lower the electrolyte concentration.

7. The method of claim 1 wherein the solution contains in addition a water-miscible organic solvent and wherein the activity of the electrolyte is reduced by cooling the solution.

8. The method of claim 1 wherein the solution contains in addition a water-miscible organic solvent and wherein the activity of the electrolyte is reduced by removing electrolyte from the solution.

9. The method of claim 1 wherein the electrolyte is an acid and its activity is reduced by neutralization.

10. The method of claim 1 wherenin the electrolyte is a base and its activity is reduced by neutralization.

11. The method of claim 9 wherein the solution contains in addition a water-miscible organic solvent.

12. The method of claim 10 wherein the solution contains in addition a water-miscible organic solvent.

13. The method of making shaped articles of a polyanionpolycation resin which comprises dissolving reactive quantities of poly (sodium styrene sulfonate) and poly (vinyl benzyl trimethyl ammonium chloride) in a solvent comprising water, acetone and sodium bromide in an amount sufficient to maintain a solution, said sodium bromide being present in an amount of at least 10% by weight of the total solution, then causing the acetone to evaporate from said solution until a solid gel forms.

14. The method of making shaped articles of polyanionpolycation resin which comprises forming an aqueous solution containing reactive quantities of two synthetic organic polymers, one of said polymers having dissociable anionic sulfonate groups attached to a polymeric chain which without the said anionic groups forms a water-insoluble film-forming resin, the other of said polymers having dissociable cationic quaternary ammonium groups attached to a polymeric chain which without said cationic groups forms a water-insoluble film-forming resin, each of said polymers having sufficient dissociable groups to render it water soluble in the absence of the other, said solution containing at least 2% by weight of a volatile water-miscible organic solvent and at least 10% by weight of an electrolyte having a pK less than 2.0 which is soluble to the extent of at least 15% by weight at room temperature in a mixture of water with 50% by weight of said organic solvent, forming the solution into the desired shape, then reducing the activity of said electrolyte by cooling the solution until a solid gel forms.

15. The method of making shaped articles of polyanionpolycation resin which comprises forming an aqueous solution containing reactive quantities of two synthetic organic polymers, one of said polymers having dissociable anionic sulfonate groups attached to a polymeric chain which without the said anionic groups forms a water-insoluble film-forming resin, the other of said polymers having dissociable cationic quaternary ammonium groups attached to a polymeric chain which without said cationic groups forms a water-insoluble film-forming resin, each of said polymers having sufficient dissociable groups to render it water soluble in the absence of the other, said solution containing at least 2% by weight of a volatile water-miscible organic solvent and at least 10% by weight of a volatile electrolyte having a pK less than 2.0 which is soluble to the extent of at least 15% by weight at room temperature in a mixture of water with 50% by weight of said organic solvent, forming the solution into the desired shape, then reducing the activity of said electrolyte by evaporating it from the solution until a solid gel forms.

16. The method of making shaped articles of polyanion-polycation resin which comprises forming an aqueous solution containing reactive quantities of two synthetic organic polymers, one of said polymers having dissociable anionic sulfonate groups attached to a polymeric chain which without the said anionic groups forms a water-insoluble film-forming resin, the other of said polymers having dissociable cationic quaternary ammonium groups attached to a polymeric chain which without said cationic groups forms a water-insoluble resin, each of said polymers having sufficient dissociable groups to render it water soluble in the absence of the other, said solution containing at least 2% by weight of a volatile water-miscible organic solvent and at least 10% by weight of an acid having a pK less than 2.0 which is soluble to the extent of at least 15% by weight at room temperature in a mixture of water with 50% by weight of said organic solvent, forming the solution into the desired shape, then reducing the activity of said acid by neutralization thereof until a solid gel forms.

17. The method of making shaped articles of polyanion-polycation resin which comprises forming an aqueous solution containing reactive quantities of two synthetic organic polymers, one of said polymers having dissociable anionic sulfonate groups attached to a polymeric chain which without the said anionic groups forms a water-insoluble film-forming resin, the other of said polymers having dissociable cationic quaternary ammonium groups attached to a polymeric chain which without said cationic groups form a water-insoluble film-forming resin, each of said polymers having sufficient dissociable groups to render it water soluble in the absence of the other, said solution extent of at least 15% by weight at room temperature in solvent, forming the solution into the desired shape, then anion-polycation resin which comprises forming an aqueous which is soluble to the extent of at least 15% by weight at room temperature in a mixture of water with 50% by weight of said organic solvent, forming the solution into the desired shape, then reducing the activity of said base by neutralization thereof until a solid gel forms.

18. The method of claim 1 wherein said polymers are the sole polymers present in said solution and said polyanion polymer contains dissociable sulfonate groups attached to a polymeric chain which without the said sulfonate groups forms a water-insoluble film-forming resin, said sulfonate groups being the sole ionic groups present in said polyanion polymer, wherein said polycation polymer contains dissociable quaternary ammonium groups attached to a polymeric chain which without the said quaternary ammonium groups forms a water-insoluble film-forming resin, said quaternary ammonium groups being the sole ionic groups present in said polycation polymer, and wherein said solution contains in addition a water-miscible organic solvent.

19. A stable aqueous solution containing a synthetic organic polymer having dissociable anionic groups attached to a polymeric chain which without said anionic groups forms a water insoluble film-forming resin, and a second synthetic organic polymer having dissociable cationic groups attached to a polymeric chain which without said cationic groups forms a water insoluble film-forming resin, each of the polymers having sufficient dissociable groups to render it water-soluble in the absence of the other, at least 10% by weight, based on the total weight of solution, of an electrolyte having a pK less than 2.0, and a water-miscible organic solvent.

20. A stable aqueous solution as claimed in claim 19 in which said anionic groups are sulfonate groups and said cationic groups are quaternary ammonium groups.

21. A stable aqueous solution as claimed in claim 19 in which one of said polymers is poly (sodium styrene sulfonate) and the other is poly (vinyl benzyl trimethyl ammonium chloride).

References Cited
UNITED STATES PATENTS

| | | | |
|---|---|---|---|
| 2,832,746 | 4/1958 | Jackson | 260—2.1 |
| 2,832,747 | 4/1958 | Jackson | 260—2.1 |
| 3,041,292 | 6/1962 | Hatch | 260—2.1 |

HAROLD D. ANDERSON, Primary Examiner

210—500; 260—2.2, 29.6, 886

UNITED STATES PATENT OFFICE
CERTIFICATE OF CORRECTION

Patent No. 3,546,142　　　　　　　Dated December 8, 1970

Inventor(s) Alan S. Michaels and Richard G. Miekka

It is certified that error appears in the above-identified patent and that said Letters Patent are hereby corrected as shown below:

Column 1, line 36, "coprecipitation" is misspelled;

Column 1, line 51, "dimension" should be --dimensions--;

Column 1, line 66, "ammonium" is misspelled;

Column 1, line 71, "polymeric" is misspelled;

Column 2, line 15, "quaternizedpoly" should be two words;

Column 5, line 68, "separately" is misspelled;

Column 7, line 63, "wherein" is misspelled;

Column 8, line 54, after "water-insoluble", insert --film-forming--;

Column 8, line 74, "form" should be --forms--;

Column 9, lines 3 to 10 are typed incorrectly and is typed below as follows:

"containing at least 2% by weight of a volatile water-miscible organic solvent and at least 10% by weight of a base having a pK less than 2.0 which is soluble to the extent of at least 15% by weight at room temperature in a mixture of water with 50% by weight of said organic solvent, forming the solution into the desired shape, then reducing the activity of said base by neutralization thereof until a solid gel forms."

Signed and sealed this 2nd day of March 1971.

(SEAL)
Attest:

Edward M. Fletcher, Jr.
Attesting Officer

WILLIAM E. SCHUYLER
Commissioner of Pat